United States Patent [19]

Kagitani et al.

[11] Patent Number: 4,486,985
[45] Date of Patent: Dec. 11, 1984

[54] MOLDING CLIP

[75] Inventors: Kazuhiro Kagitani; Seikichi Yoshitsugu, both of Sayama; Akira Mizusawa, Fujisawa, all of Japan

[73] Assignees: Nissan Motor Co., Ltd.; Nifco Inc., both of Yokohama, Japan

[21] Appl. No.: 281,312

[22] Filed: Jul. 8, 1981

[30] Foreign Application Priority Data

Jul. 16, 1980 [JP] Japan .................. 55-99298[U]

[51] Int. Cl.³ .............................................. E06B 3/58
[52] U.S. Cl. .................... 52/127.7; 52/208; 52/397; 52/769; 52/716; 24/292
[58] Field of Search .......... 52/208, 397, 822, 824, 52/717, 718, 127.7, 764, 771, 773; 24/289, 292, 293

[56] References Cited

U.S. PATENT DOCUMENTS

| 2,579,279 | 12/1951 | Tinnerman | 24/293 |
| 3,403,881 | 10/1968 | Bennett et al. | 52/397 X |
| 3,566,570 | 3/1971 | Evans | 52/717 X |
| 4,139,971 | 2/1979 | Kimura | 52/208 |
| 4,172,000 | 10/1979 | Horike et al. | 52/208 X |
| 4,349,993 | 9/1982 | Tanaka et al. | 52/208 |

OTHER PUBLICATIONS

Neslo Manufacturing Corp., "Clip-Grip Steel Stud Partition Systems," AIA File, No. 17-E-1, 1957.

Primary Examiner—John E. Murtagh
Assistant Examiner—Michael Safavi
Attorney, Agent, or Firm—Trexler, Bushnell & Wolters, Ltd.

[57] ABSTRACT

A spacer with an h-shaped cross section and having a void in the lower part thereof is provided on the vertical wall of a frame-like depression formed in an automobile body for the mounting of a pane of glass. The spacer has a number of appropriately spaced slits communicating with the void provided therein. The insertion member of a clip consisting of an insertion member and an operating member is inserted through the slit and the clip is thereafter slid in a predetermined direction to attach the clip to the spacer. Finally, the edge of a molding is engaged with the operating member to fix the molding to the automobile body.

8 Claims, 9 Drawing Figures

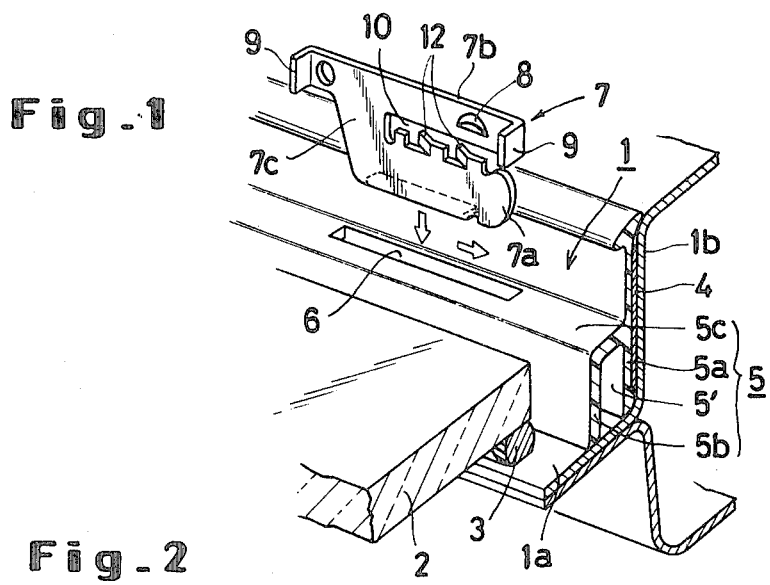
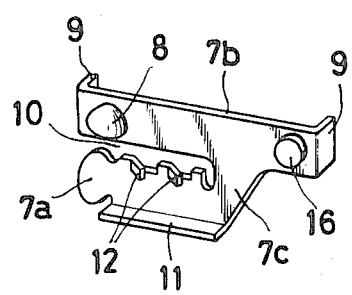
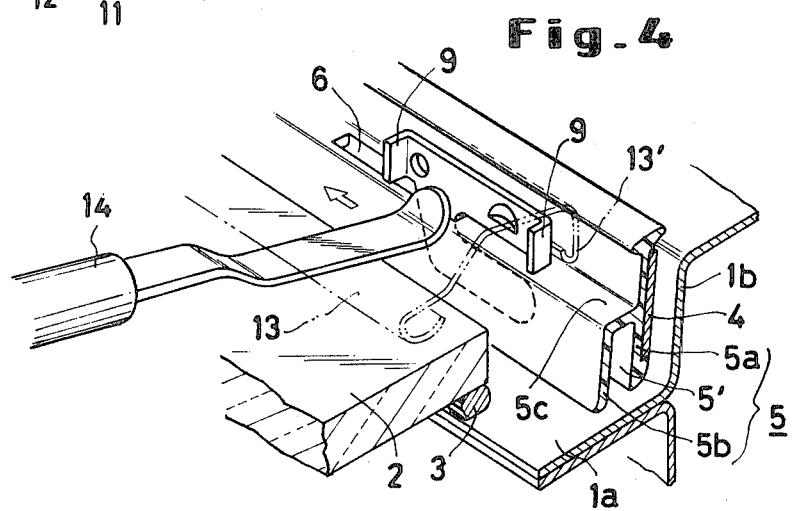

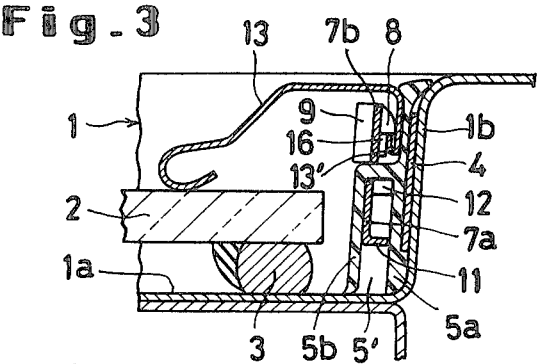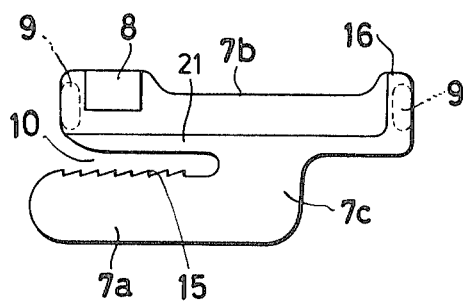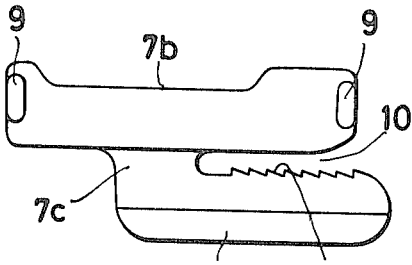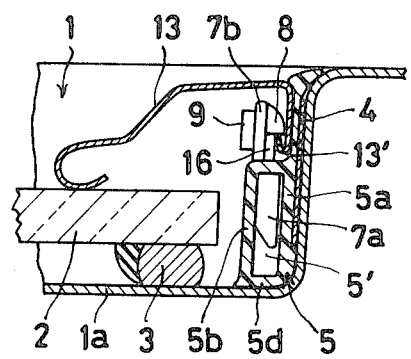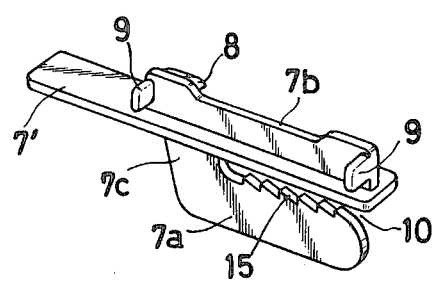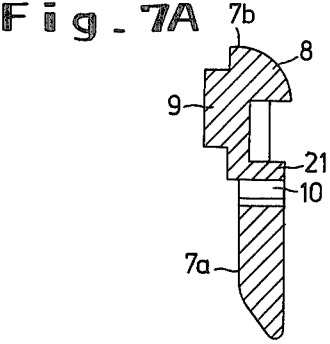

MOLDING CLIP

BACKGROUND OF THE INVENTION

This invention relates to a clip for attaching a decorative molding around the edge of a pane of glass mounted within a frame-like depression formed in an automobile body to receive a windshield or rear window, the pane of glass being attached to the top surface of an edge projecting into the window opening at the bottom of the depression.

For the purpose of attaching clips for retaining a molding around an automobile windshield or window, of preventing the molding from marring the paint finish of the automobile body at the time of attachment and of precluding the entry of dirt and water between the molding and the car, it has in the past been common to fix a spacer having a J-shaped cross section with its trough opening upward or a spacer having an h-shaped cross section with an interior void around the vertical wall of the depression in which the windshield or window is to be mounted and to use the trough or void of the spacer to retain a group of clips for attaching the molding, the clips being spaced at intervals along the length of the spacer. The clips used in these conventional arrangements have been of various types. (U.S. Pat. Nos. 4,139,971 and 4,172,000 and Japanese Patent application Public Disclosure No. 114,786/1980.)

These conventional clips are attached to the spacer by being inserted into the trough or void of the spacer from above and when a once-attached molding is to be removed, it is necessary to insert a tool between the glass and the molding and then either to extract the clip upwardly or to grasp the clip and pull it forward to release the engagement between the clip and the molding. As this operation requires the worker to use a tool to locate clips which he cannot see because they are covered by the molding, the work is troublesome and inefficient.

SUMMARY OF THE INVENTION

The object of the present invention is to provide a clip for attaching a molding to an automobile window which is of simple structure and which permits the clips which retain the molding to be detached from the spacer with ease.

In order to attain this object, the clip according to the present invention is arranged so that the molding can be attached merely by inserting a number of clips into the void of a spacer having an h-shaped cross section which is attached along the vertical wall of a frame-like depression formed in an automobile body and then sliding the clips in the longitudinal direction of the spacer and so that when the pane of glass or the molding is to be removed, the clips can be easily detached from the spacer by inserting a tool between the glass and the molding and sliding the clips in the opposite direction.

The other objects and features of the invention will be clear from the following detailed explanation made in reference to the attached drawings.

BRIEF EXPLANATION OF THE DRAWING

FIG. 1 is a perspective view of a first embodiment of the clip in accordance with the present invention showing the manner in which it is attached to a spacer fixed to a window frame;

FIG. 2 is a perspective view from behind of the clip shown in FIG. 1;

FIG. 3 is a cross-sectional view showing a molding attached to a window frame by the clip shown in FIG. 1;

FIG. 4 is an explanatory view showing how a molding once attached to a window frame is removed;

FIG. 5 is a front view of a second embodiment of the clip in accordance with the present invention;

FIG. 6 is a rear view of the clip shown in FIG. 5;

FIG. 7 is a cross-sectional view showing a molding attached to a window frame by the clip shown in FIG. 5;

FIG. 7A is a cross-sectional view of the clip shown in FIGS. 5-7; and

FIG. 8 is a perspective view of a third embodiment of the clip in accordance with the present invention.

DESCRIPTION OF PREFERRED EMBODIMENTS

A first embodiment of the molding clip according to the present invention is shown in FIGS. 1 to 4. The car body with which the molding clip is employed is provided with a window surrounded by a frame-like depression 1 having as its bottom wall a projecting edge 1a. A pane of glass 2 is fitted into the frame-like depression 1 and is fixed on the upper surface of the edge 1a. A gasket 3 of sufficient resiliency and shape is generally interposed between the glass 2 and the edge 1a for dampening vibration or impact shock otherwise substantially transferable from the car body to the glass 2. The depression 1 further has a vertical wall 1b having a spacer 5 attached over the full length thereof by means of a double-faced tape 4. The spacer 5 used in the present invention is formed of plastic to have an appropriate degree of resilience and is of approximately the same height as the vertical wall 1b. The spacer 5 is integrally formed of a back member 5a the rear surface of which is attached to the double-faced tape 4 and a step-shaped front member 5b provided so as to form between itself and the front surface of the back member 5a a void 5' which is closed at least at the top. Although, as shown in FIGS. 1, 3 and 4 of the drawings, the spacer 5 typically has an h-shaped cross-section with the void 5' being open at the bottom, it can also of course be constructed so that the void 5' is closed at both the top and the bottom (see, for example, FIG. 7). The upper portion of the front member 5b which covers the top of the void 5' forms a step 5c (FIGS. 1, 4) having a number of slits 6 which communicate with the void 5' provided at appropriate intervals therein. A clip 7 is inserted downwardly into each slit 6 and then is slid in the longitudinal direction of the slit 6 to attach the lower half of the clip 7 to the spacer 5.

The clip 7 can be pressed from metal plate material, can be formed from plastic by extrusion molding or can be fabricated in some other way. Regardless of how it is formed, however, it is required to have an insertion member 7a to be inserted downwardly through the slit 6 and positioned inside the void 5', an upper engagement and operating member 7b to be positioned above the step 5c and having on its rear surface opposing the back member 5a of the spacer 5 a claw 8 for catching a hook-shaped edge 13' of a molding 13 and on its front surface one or more operation parts 9 projecting from the front surface so as to be catchable by a tool 14, a slot 10 located between the insertion member 7a and the operating member 7b, the slot 10 being open at one end and being of about the same thickness as that of the step 5c, and a connecting portion 7c connecting the other ends of the insertion member 7a and the operating member 7b.

The clip 7 of the embodiment shown in FIGS. 1 to 4 is press-formed from steel to have the claw 8 formed by deformation of the sheet material and the operating parts 9 formed by bending both ends of the operating member 7b at right angles. The insertion member 7a is further provided along its bottom edge with a rearwardly bent portion 11 and at its upper edge with one or more oblique lugs 12 so that when the insertion member 7a is positioned within the void 5' of the spacer 5, its front face will come into contact with the inside surface of the front member 5b while the leading edge of the bent portion 11 and the tips of the oblique lugs 12 come into contact with the inside surface of the back member 5a. This arrangement compensates for the thinness of the sheet material from which the clip 7 is pressed and assures that the insertion member 7a will be prevented from moving backward and forward within the void 5'. The position of the rearwardly bent portion 11 is not limited to the bottom edge of the insertion member 7a nor is the position of the oblique lugs 12 limited to the top edge, and the position of these members may be reversed or both the top and bottom edges may be provided with bent members 11 or lug members 12.

The length of the slits 6 in the longitudinal direction of the spacer 5 is made great enough to permit the insertion member 7a and the connecting portion 7c to be inserted therein from above, and the width thereof is made equal to that of the void 5', that is, to the space between the back member 5a and the front member 5b of the spacer 5.

The insertion member 7a of the so-constructed clip 7 is inserted into the slit 6 with the operating member 7b left projecting above the step 5c. Next, the clip 7 is slid toward the open end of the slot 10 (in the direction of the longitudinally-directed arrow, relative to the slit 6, as shown in FIG. 1) causing the insertion member 7a to move within the void 5' and the insertion member 7a and the operating member 7b to clamp the step 5c which is now caught within the slot 10. This sliding operation can be continued until the connecting portion 7c of the clip 7 abuts against one end of the slit 6. A clip 7 is inserted in every one of the slits 6 provided at intervals along the step 5c and all of the clips 7 are slid in the same direction to attach them firmly to the spacer 5. If necessary, the slot 10 of the clip 7 can be made progressively narrower from its open end inward so that as the clip 7 is slid, the insertion member 7a and the operating member 7b will gradually exert a stronger clamping force on the step 5c.

When the clip 7 is attached to the step 5c of the spacer 5 as described above, the claw 8 projecting from the back of the operating member 7b assumes a position opposite the front surface of the back member 5a of the spacer 5. It is possible to force the hooked edge 13' of the molding 13 between the back member 5a and the claw 8 of the clip 7 to bring the hooked edge 13' into engagement with the clip 7 and thereby attach the molding 13 along the edge of the pane of glasse 2. When, at some later time, it becomes necessary to remove the molding 13, the tool 14 is inserted between the glass 2 and the front edge of the molding 13 as shown in FIG. 4. The tip of the tool 14 is then used to catch one of the operating parts 9 on each of the clips 7 to slide it in the opposite direction from that in which it was slid during the attachment operation (in the direction of the arrow in FIG. 4). This causes the clip 7 to return to the position it was in when first inserted into the slit 6 from above and allows the insertion member 7a to be extracted from the void 5' of the spacer 5. Therefore, the clips 7 can be extracted and the molding 13 removed simply by pulling the molding 13 upward. As all clips 7 are attached to the spacer 5 by sliding them in the same direction, it is not necessary to search out the clips 7 with the tool 14 one by one. All that need be done is to insert the tool 14 between the glass 2 and the molding 13 and then to move the tool 14 in the direction opposite the direction in which the clips 7 were slid during attachment. This is an extremely simple operation which allows not only the molding 13 but also the clips 7 to be recovered without any damage whatsoever.

FIGS. 5 to 7 and 7A show an embodiment of the clip 7 according to the present invention which is extrusion molded from plastic. The operating member or portion 7b is relatively thin and is provided on the rear face thereof along the lower or confronting edge with a horizontal web 21 to which the operating or mounting portion is joined in partially offset relation. The thickness of the insertion member 7a is made approximately equal to the width of the void 5' and its upper edge is provided with teeth 15. The claw 8 and the operating parts 9 are formed on the operating member 7b as thick portions projecting from the back and front faces thereof, respectively. Therefore, as in the case of the clip 7 made from steel sheet material described above, this plastic clip 7 can be attached to the spacer 5 by catching the step 5c in the slot 10 between the insertion member 7a and the operating member 7b. Once the molding 13 has been attached to the clips 7 retained by the spacer 5, the clips 7 can thereafter be slid in the opposite direction to the direction in which they were slid during attachment and both the molding 13 and the clips 7 can be removed by pulling the clips 7 out of the slits 6.

The claw 8 can be provided at the center of the operating member 7b or at any other position between its opposite ends. However, when, as in this embodiment (FIG. 5), it is provided at one end of the operating member 7b (at the end toward which the slot 10 opens), an advantage is obtained in that the spring action of the operating member 7b at the time the hooked edge 13' of the molding 13 is forced into engagement with the hook 8 can be utilized to the optimum. Moreover, it is possible to provide one or more protuberances 16 on the rear face of the operating member 7b for the purpose of pressing against the hooked edges 13' of the molding 13 in order to hold the molding 13 snugly against the front face of the back member 5a of the spacer 5. The protuberance(s) 16 is preferably provided on one or both sides of the claw 8 when the claw 8 is formed at the center of the operating member 7b. On the other hand, when, as in this embodiment, the claw 8 is provided toward one end, it is preferable to form the protuberance 16 at the other end and to have it project less than the claw 8. In the case of the embodiment depicted in FIGS. 1 to 4, the protuberance 16 is formed by deformation of the metal sheet material from which the clip 7 is made, and in the case of the embodiment shown in FIGS. 5 to 7 it is formed by increasing the thickness of the plastic material.

Also, as shown in FIG. 7, it is possible to close the bottom of the spacer 5 to fully enclose the void 5'. With this arrangement, any water leaking through the slits 6 is prevented (by 5d) from reaching the edge 1a, thus protecting the edge 1a from rust.

Further, as shown in FIG. 8, it is possible to provide on the connecting portion 7c of the clip 7 a flange 7' which is extended rearwardly (with respect to the sliding direction of the clip 7 at the time of attachment) and is positioned so that when the insertion member 7a is inserted through the slit 6 and the clip 7 is slid during the attaching operation, it will slide along the top of step 5c to come into a position where it covers the slit 6. The operating member 7b is provided on the flange 7' when the clip 7 is in the fully attached state so that water is prevented from leaking into the interior through the slit 6.

When the clip 7 is formed of plastic, the flange 7' can easily be formed integrally therewith.

It goes without saying that optimum rust prevention will be obtained when both of the foregoing measures are used together, i.e., when the clip 7 is provided with the flange 7' and the void 5' is fully enclosed.

As is clear from the foregoing explanation, a spacer 5 having an h-shaped cross section and possessing a void 5' in its lower part is attached to the vertical wall 1b of a frame-like depression 1 for mounting a pane of glass 2, the step 5c of the spacer 5 being provided with a plurality of approximately spaced slits 6. The insertion members 7a of clips 7 according to the present invention are inserted through these slits 6 and are then attached to the spacer 5 by a sliding operation. One edge 13' of a molding 13 is forced between the clips 7 and the spacer 5 to complete attachment of the molding 13. When the molding 13 is to be detached, a tool 14 is inserted between the glass 2 and the molding 7 and moved in the direction opposite to that in which the clips 7 were slid during attachment. As a result, the clips 7 are freed from the spacer 5 and the molding 7 can be easily detached.

What is claimed is:

1. In combination with a spacer, a molding and a frame-like depression, said molding being resilient and having a retaining means integral with a first edge portion thereof for permitting said molding to be retained adjacent said spacer, said depression being formed in a body for securing a pane of glass to said body, said molding having a second edge portion resiliently engageable with said pane of glass, said depression including a first wall and a second wall integral with said first wall and substantially transverse thereto, said pane of glass being interposed intermediate said second edge portion of said molding and one of said first and second walls, said spacer being formed of a back member and an integral projecting front member forming a step, said step being transverse to said back member, the remainder of said front member being spaced from said back member thereby forming a void intermediate the lower front surface of said back member and said front member, the rear surface of said back member being secured to the other one of said first and second walls, said step including a plurality of longitudinally spaced, longitudinally elongated slits communicating with said void, an improved molding clip comprising: an insertion member inserted through one of said slits from above and positioned within said void; an operating member superpositioned above said step, said molding being positioned within said depression intermediate said operating member and said back member after said insertion member has been positioned in said void; there being an elongated slot open at one end thereof and disposed intermediate said insertion member and said operating member, said slot having a width sufficient for inserting said insertion member into said void; and, a connecting portion integral with said insertion member and said operating member and forming a closed end of said slot, said insertion member including transversely stabilizing means for transversely stabilizing said operating member relative to said step with said insertion member positioned in said void, said clip having been moved longitudinally relative to said slit, said operating member having an upper edge and including a projection integral with and disposed outwardly from the rear surface of said operating member and spaced downwardly from the top edge for engaging said molding and said retaining means of said molding, said projection including means for biasing said retaining means toward said slit and for biasing said molding toward said front surface of said back member thereby positioning said first end portion of said molding between said member and said back member, said pane of glass having been positioned upon said one of said first and second walls, said second edge portion of said molding resiliently engaging said pane of glass, said operating member having at least one operating part projecting sufficiently far from the front surface of said operating member and extending downwardly from the upper edge substantially transversely thereof so as to provide a means engageable by a tool for moving said clip longitudinally relative to said slit to permit subsequent removal of said insertion member from said void thereby permitting removal of said clip from said slit for effective removal of said molding, said transversely stabilizing means comprising: at least one lug integral with said insertion member and outwardly disposed relative to the rear surface of said insertion member, said lug being disposed away from the open end of said slot, said lug having an end portion biasedly engageable with said lower front surface of said back member, said insertion member being positioned in said void, for biasing the front surface of said insertion member toward said front member.

2. The improved molding clip of claim 1, wherein: the rear surface of said operating member is further provided with a second projection integral with said operating member and disposed outwardly therefrom relatively less than the first projection.

3. The improved molding clip of claim 1, further comprising a flange provided on said connecting portion, said flange being slidingly contactable with the top of said step for effecting transverse orientation of said clip relative to said step.

4. A molding clip comprising a relatively thin, elongated operating portion having a longitudinal dimension and an upper edge, an elongated mounting portion having a longitudinal dimension substantially parallel to said operating portion longitudinal dimension and engageable with a workpiece to mount said clip and having an effective thickness greater than said relatively thin operating portion, said mounting portion being joined only adjacent one end to said operating portion, said operating portion and said mounting portion being substantially coplanar and defining therebetween an open-ended slot having substantially parallel confronting edges for lying on opposite sides of a workpiece to mount said clip on a workpiece, said operating portion having at least one projection outwardly from one face thereof extending downwardly from adjacent said upper edge substantially transversely thereof and engageable by a tool to move said clip longitudinally for release from a workpiece, said operating portion having a retaining projection from the opposite face thereof and spaced downwardly from said upper edge for engagement by and retention of a second workpiece, and said operating portion further having a web on said opposite face along the confronting edge thereof to which said mounting portion is joined in partially offset relation to said operating portion.

5. A molding clip as set forth in claim 4 wherein said retaining projection comprises a claw.

6. A molding clip as set forth in claim 5 and further including a second projection from said opposite face of said operating portion.

7. A molding clip as set forth in claim 4 wherein said at least one projection from one face of said operating portion comprises two projections respectively at opposite ends of said operating portion.

8. A molding clip as set forth in claim 4 formed of molded plastic material wherein the greater effective thickness of said mounting portion is obtained by molding said mounting portion thickness.

* * * * *